(12) United States Patent
Couture (10) Patent No.: US 7,178,254 B2
(45) Date of Patent: Feb. 20, 2007

(54) MARKING FIXTURES AND METHODS (75) Inventor: Kevin M. Couture, Meriden, CT (US)

(73) Assignee: United Technologies Corporation, Hartford, CT (US)

( * ) Notice: Subject to any disclaimer, the term of this patent is extended or adjusted under 35 U.S.C. 154(b) by 0 days.

(21) Appl. No.: 11/173,867

(22) Filed: Jun. 30, 2005

(65) Prior Publication Data
US 2007/0006475 A1    Jan. 11, 2007

(51) Int. Cl.
*B23Q 16/00* (2006.01)
*B25B 1/00* (2006.01)
*G01B 5/00* (2006.01)

(52) U.S. Cl. ........................................ 33/573
(58) Field of Classification Search ............ 33/573
See application file for complete search history.

(56) References Cited

U.S. PATENT DOCUMENTS 4,877,227 A * 10/1989 Sassella et al. ............. 269/236
5,427,478 A * 6/1995 Boucher et al. ............. 269/71
6,135,022 A * 10/2000 Troester ...................... 101/18
2002/0148131 A1* 10/2002 Mauro ......................... 33/569
2005/0086816 A1* 4/2005 Siegel ........................ 33/18.1

OTHER PUBLICATIONS

Direct Part Marking—Implementation Guide, Rolls-Royce, Jun. 1, 2004.
Charlie Wilson and Andy Jay, P&W 2D Part Marking & Traceability Intiative, Aug. 2004.

* cited by examiner

*Primary Examiner*—Christopher W. Fulton
(74) *Attorney, Agent, or Firm*—Bachman & LaPointe, P.C.

(57) ABSTRACT

A marking system includes a fixture having a base and means for receiving a pair of jaws in an installed condition. The fixture includes means for articulating the installed jaws relative to the base with at least first and second rotational degrees of freedom. A pair of the jaws includes a first jaw having a surface portion generally concave and complementary to a suction side portion of an airfoil of a first turbine engine element. A second jaw has a surface portion generally convex and complementary to a pressure side portion of the airfoil.

23 Claims, 6 Drawing Sheets

MARKING FIXTURES AND METHODS

BACKGROUND OF THE INVENTION

The invention relates to the manufacture and repair of turbine engine components. More particularly, the invention relates to the identification marking of turbine engine elements.

Identification marking of turbine engine components has drawn much recent attention. Although the purposes and uses of such marking may vary, key examples are seen during engine manufacture, repair and, more particularly, engine component repair. It has become standard practice for some manufacturers and repair/refurbishing operations to mark each component as it is received for repair or refurbishing. The markings may be identification markings (e.g., operator-readable alphanumeric serial markings or machine-readable codes (e.g., 2-d dot matrix codes)). The markings may, themselves, contain further information (e.g., date/time of repair, place of repair, repair kind code, or the like) or such information may be stored in a database accessible based upon the markings.

An exemplary marking technique is dot peen indentation marking. Other techniques include laser and/or chemical etching. Dot peen marking has advantages of speed, low cost, and an extreme degree of robustness.

Typical components have a limited portion of surface area suitable for marking. For example, the airfoils of turbine and compressor blades may be off-limits as may other surfaces exposed to the gas path or to high stresses. For such blades, marking at particular locations along the blade platform underside and/or the ends of the blade attachment root may be appropriate. Thus, for a given component, a manufacturer may specify a finite number of accepted marking locations/sites.

With typical marking apparatus, the marking location on the component must have a predetermined spatial relationship to a marking head (i.e., the location must be in an operative marking position). Custom fixtures may be used to hold the components. For example, due to different airfoil and other shapes, different fixtures may be required to hold airfoils of each blade stage in the engine. Staying with the example of blades, the fixtures may have surfaces complementary to the particular shape of the airfoils of the associated stage. A given fixture positions a given one of the permitted locations in the operative marking position. To address the various permitted locations, multiple fixtures may be required for the given component, which is expensive and accommodates valuable work cell space.

Thus, to mark the components as they come in or go out, an operator must inspect each component to see which permitted location(s) have not already been marked. The operator then selects the appropriate unmarked location and selects the fixture or adapter for that specific location from the various fixtures/adapters for that specific component.

SUMMARY OF THE INVENTION

One aspect of the invention involves a system including a fixture having a base and means for receiving a pair of jaws in an installed condition. The fixture includes means for articulating the installed jaws relative to the base with at least first and second rotational degrees of freedom. A pair of the jaws (e.g., a first of several pairs) includes a first jaw having a surface portion generally concave and complementary to a suction side portion of an airfoil of a first turbine engine element. A second jaw has a surface portion generally convex and complementary to a pressure side portion of the airfoil.

In various implementations, there may be additional sets of jaw pairs, each having first and second jaws whose surface portions are complementary to suction and pressure sides of different airfoils from different turbine engine elements. The means for articulating may further provide articulation in a third rotational degree of freedom.

The apparatus may be used in a marking operation. For example, the first turbine engine element may be received and installed to the first pair of jaws. The first pair of jaws may be installed to the fixture. A first marking site may be selected on the first turbine engine element. The fixture may be articulated to bring the first marking site to a first spatial relationship with a marking device. The marking device may be used to mark the first marking site.

The details of one or more embodiments of the invention are set forth in the accompanying drawings and the description below. Other features, objects, and advantages of the invention will be apparent from the description and drawings, and from the claims.

BRIEF DESCRIPTION OF THE DRAWINGS

Like reference numbers and designations in the various drawings indicate like elements.

DETAILED DESCRIPTION

Figure 1:
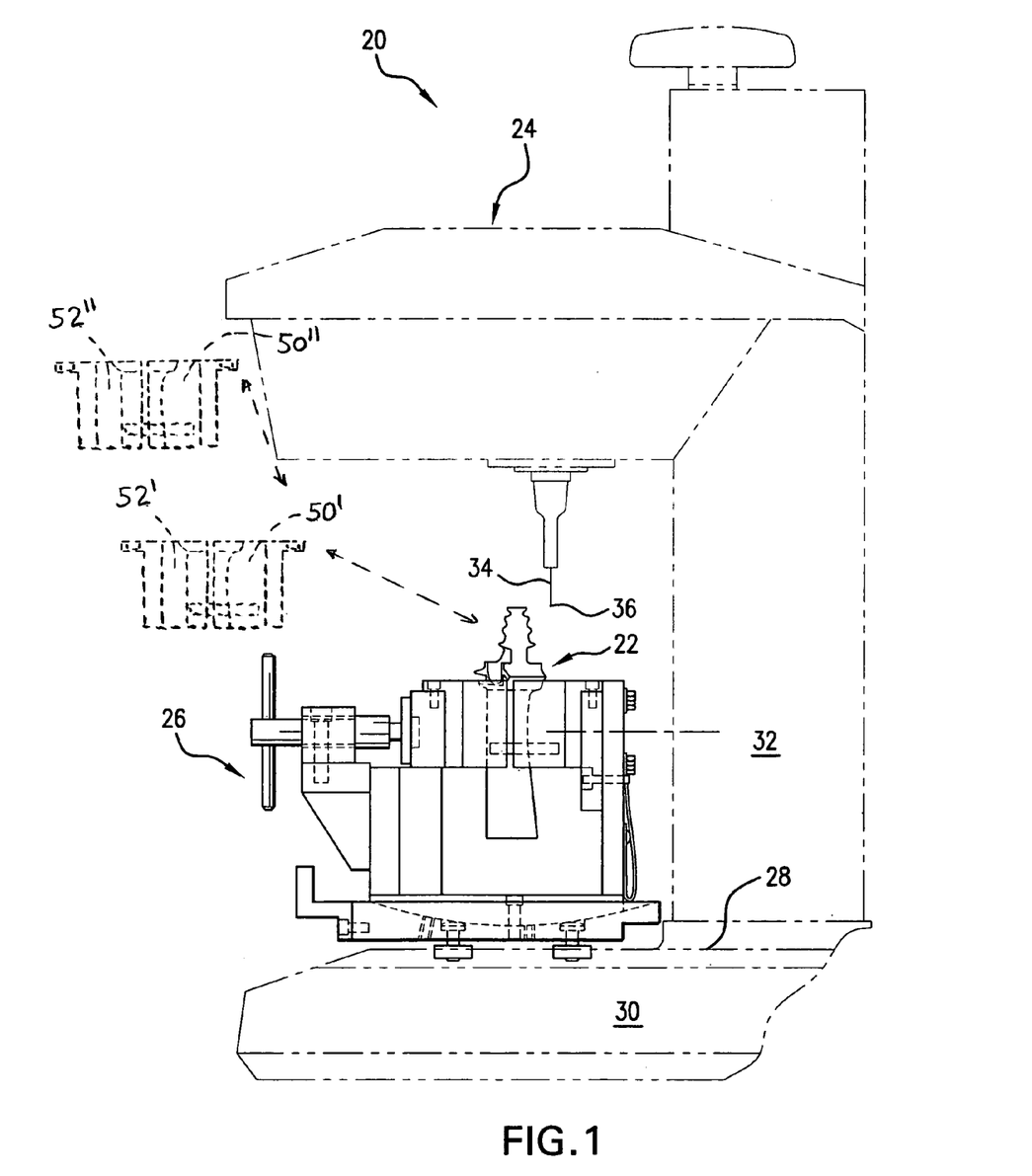
FIG. 1 is a view of a marking station.

FIG. 1 shows a marking station 20 for marking a blade 22. The exemplary station 20 includes a marking apparatus or head 24 such as a dot-peen marker. The blade 22 is held in a fixture assembly 26. The exemplary fixture 26, is, in turn, mounted to the upper surface or top 28 of a base 30 of the station. The head 24 may be mounted relative to the base 30 such as by an arm structure 32. The exemplary head 24 may be vertically movable along the arm under computer control. The exemplary head carries a marking bit 34 with a lower marking tip 36. The head or the bit may be movable horizontally under computer control. For example, the bit may be movable fore and aft (away from and toward the arm) and left and right by motors (not shown) in the head.

Figure 2:
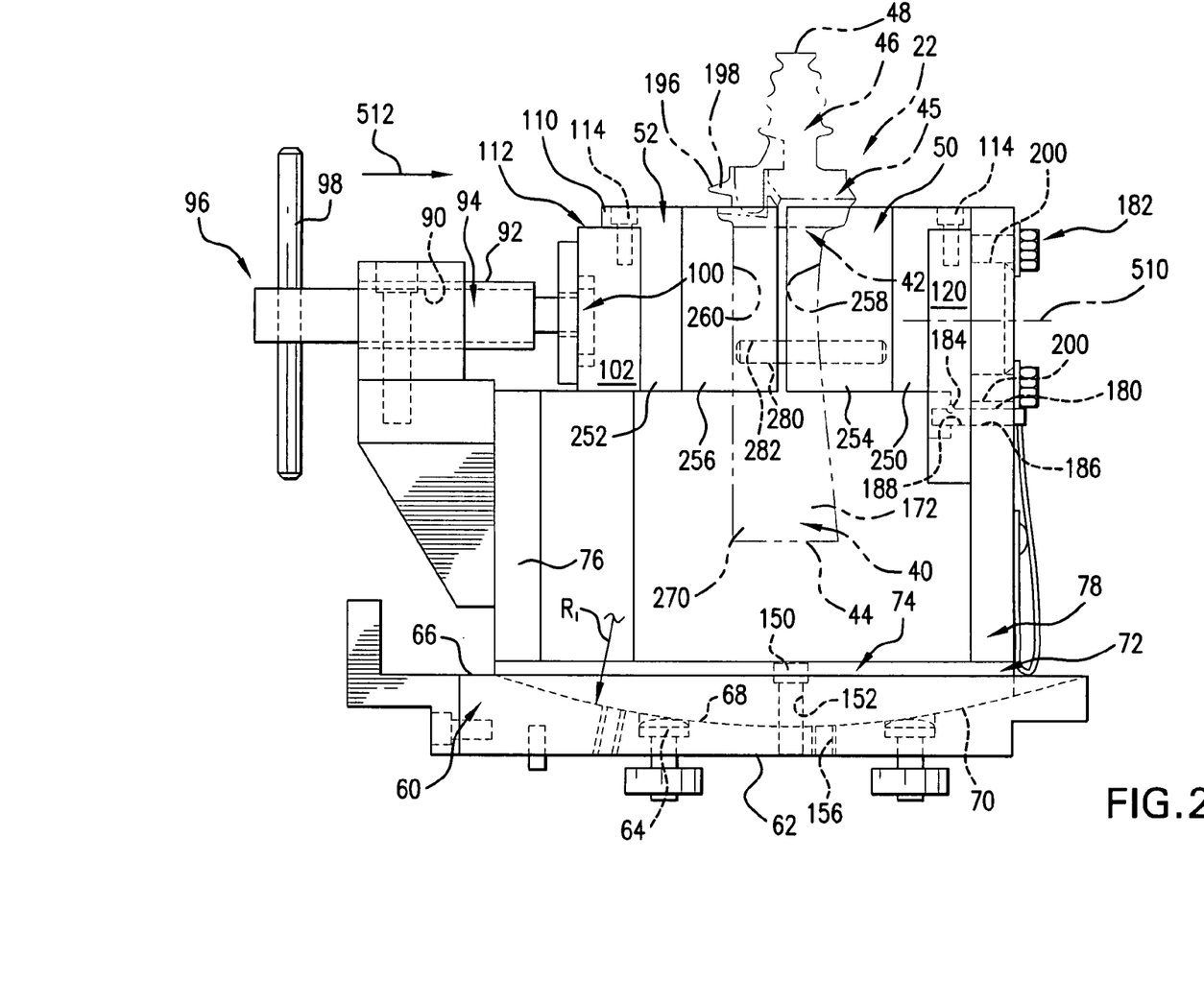
FIG. 2 is a side view of a fixture of the station of FIG. 1.

FIG. 2 shows further details of the blade 22 and fixture 26. The blade has an airfoil 40 extending outboard from a root 42 to a tip 44. The airfoil base 42 is attached to a platform 45 (e.g., unitarily formed therewith). An attachment root 46 extends from the inboard end of the platform 45 to a terminus 48. The exemplary root 46 has a convoluted "fir tree" profile for mating with a complementary slot in a disk (not shown) to secure the blade to the disk. The blade 22 is held between removable jaw elements 50 and 52 of the fixture 26.

The exemplary fixture 26 is a vise mechanism having a fixture base 60. The exemplary base 60 may be mounted to the station base 30 (e.g., with an underside 62 of the base 60 contacting the top 28 and secured thereto by means of fasteners 64. The upper surface 66 of the base 60 includes a concave surface 68. In the exemplary fixture 26, the surface 68 is singly concave having an essentially fixed radius of curvature $R_1$. An axis 500 (FIG. 3) of said curvature is near terminus 48. An exemplary $R_1$ is 0.3 m, more broadly 0.1–2.0 m or 0.2–0.6 m. The surface 68 is engaged by a complementary convex surface 70 of a fixture main body 72. The main body 72 includes a base portion 74 along which the surface 70 is formed. The main body 72 includes fore and aft upright structures 76 and 78 extending upward from the main body base 74.

Figure 3:
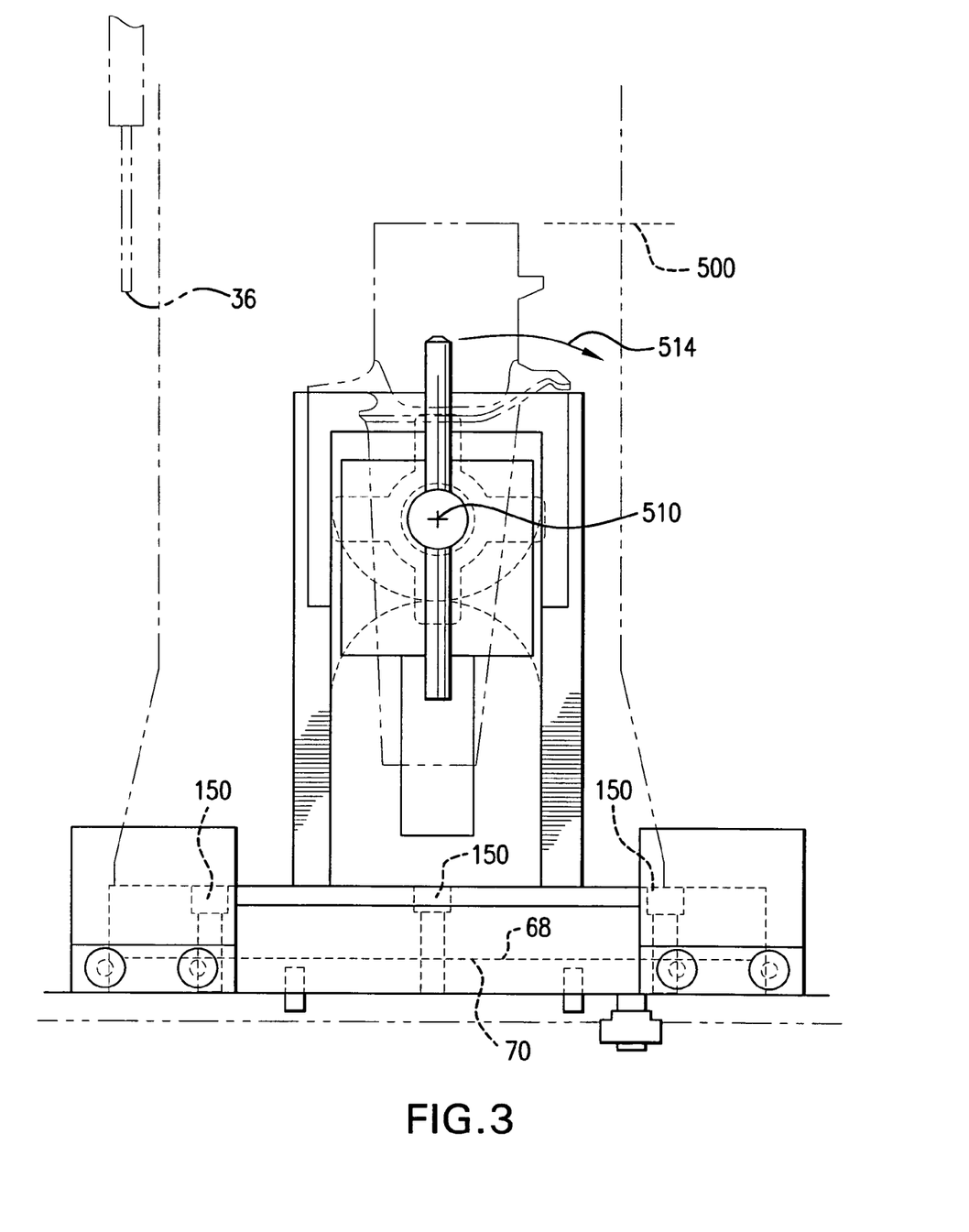
FIG. 3 is a front view of the fixture of FIG. 2.

The main body 72 serves as the body of a vise or clamping structure to which the jaws 50 and 52 act as jaw inserts. In the exemplary fixture 26, the fore upright 76 serves as a screw carrier having an internally threaded portion 90 along a screw axis 510 (FIG. 3). The internally threaded portion 90 threadingly receives an externally threaded body 92 of a screw 94. At an outboard end 96, the screw 94 is engaged to a handle 98 and secured thereto against relative rotation about the axis 510. At an inboard end 100, the screw 94 engages a mounting block 102. The mounting block 102 acts as a movable jaw carrying the insert 52. In the exemplary fixture 26, a forward flange 110 of the jaw 52 sits atop an upper surface 112 of the block 102 and is secured thereto by one or more screws 114. The connection of the screw 94 to the block 102 advantageously permits relative rotation about the axis 510 so that the block may maintain its orientation as it translates along the axis 510. However, the connection advantageously permits transmission of force along the axis 510 at least in a direction 512 moving the block 102 toward the jaw 50. Rotation of the handle in a direction 514 (FIG. 3) about the axis 510 drives the block 102 and jaw 52 in the direction 512. Opposite rotation moves them in an opposite direction. The jaw 50 may similarly be mounted to an aft mounting block 120 carried by the aft upright structure 78. Mounting of the block 120 to the upright structure 78 advantageously permits a lockable relative rotation about the axis 510 (e.g., as is discussed below).

FIG. 2 shows exemplary means for providing the lockable relative rotation about the axis 500. One or more locking members 150 selectively lock the main body base 74 to the fixture base 60. The exemplary locking members 150 are formed as screws (e.g., a transverse array of three screws 150 shown in FIG. 3). Each of the exemplary screws 150 passes through an associated hole 152 in the body base 74. In an inserted condition, the screws may further extend into one of an associated group of holes 154, 156, and 158 in the fixture base 60. In an exemplary embodiment, the hole 152 is unthreaded whereas the holes 154, 156, and 158 are threaded to engage the screw threads to enable a tight securing in the inserted/engaged condition of the screw 150. With the screws disengaged (i.e., out of the holes 154, 156, and 158) the fixture body 72 may be rotated about the axis 500 to bring the hole 152 into alignment with one of the holes 154, 156, and 158. In the exemplary implementation, the hole 154 corresponds to a neutral condition (e.g., wherein the axis 510 is horizontal). The hole 156 corresponds to a slightly inclined orientation (e.g., with the axis 510 rotated counterclockwise by about 5° as viewed in FIG. 2. The hole 158 corresponds with a declined orientation (e.g., the axis 510 rotated clockwise by about 20° as viewed in FIG. 2). For example, with the terminus 48 faceted, the identified rotations can bring each of the facets into the operative position and appropriate orientation (e.g., horizontal). The marking site need not be exactly horizontal. For small transverse marker excursions (e.g., up to about 6 mm) small off-horizontal angles (e.g., up to about 5°) may be acceptable (i.e., the marker can still effectively mark, especially if the head height is fixed). The smaller such angle, the greater the permitted transverse excursion (e.g., dimension of the marking).

Figure 4:
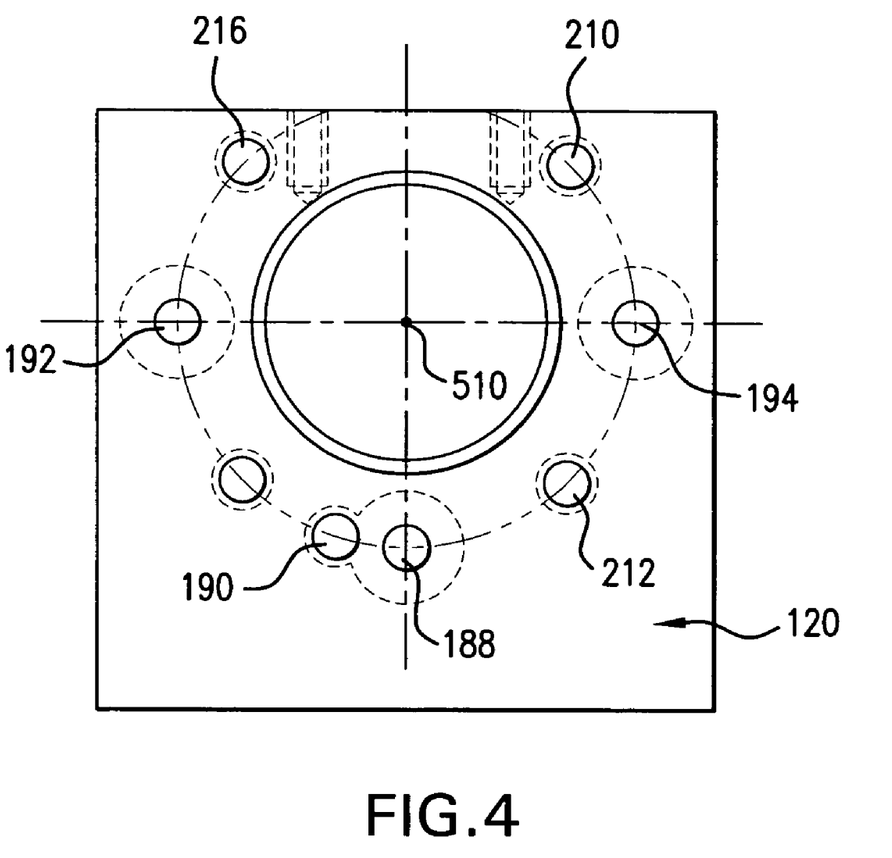
FIG. 4 is a back view of a back mounting block of the fixture of FIG. 2.

FIG. 2 shows further details of the means for providing lockable rotation of the jaws and blade relative to the fixture body 72 about the axis 510. In the exemplary fixture 26, the block 120 has a circular boss 170 received in a circular aperture 172 in the upright 78 centered on the axis 510. Sliding interaction of the boss 170 and surface of the aperture 172 guide the relative rotation about the axis 510. The rotation may be locked by locking means. Exemplary locking means include one or more locking members 180 and 182. An exemplary locking member 180 is formed as a pin. An exemplary pin is shown having a spring-loaded ball detent 184 for detent locking the pin in an inserted position extending through apertures or holes in the upright 78 and block 120. An exemplary hole 186 is shown in the block 78. FIG. 2 also shows an exemplary hole 188 in the block 120. FIG. 4 is an aft view of the block 120 showing the hole 188. FIG. 4 further shows additional holes 190, 192, and 194 of like size and at like radius from the axis 510. The exemplary holes 186, 188, 190, 192, and 194 are unthreaded.

With the locking members 180 and 182 in disengaged conditions, the block 120 may be rotated about the axis 510 relative to the upright 78. This rotation may be of both blocks 120 and 102, their mounted jaws 50 and 52, and the blade 22 as a unit. The rotation may bring any of the holes 188, 190, 192, and 194 into alignment with the hole 186 of FIG. 2. For example, relative to the hole 188, the holes 192 and 194 may represent respective 90 degree rotations of the block counterclockwise and clockwise, respectively as viewed in FIG. 4. The hole 190 may be at a different angle. An exemplary angle involves a counterclockwise rotation of 17°30' which facilitates marking on the underside 196 (FIG. 2) of a platform tongue 198. Such tongues are common blade features having undersides within a few degrees of the exemplary underside orientation. Thus the 17°30' angle is a good approximation, allowing the fixture to be used for a variety of blades.

Figure 5:
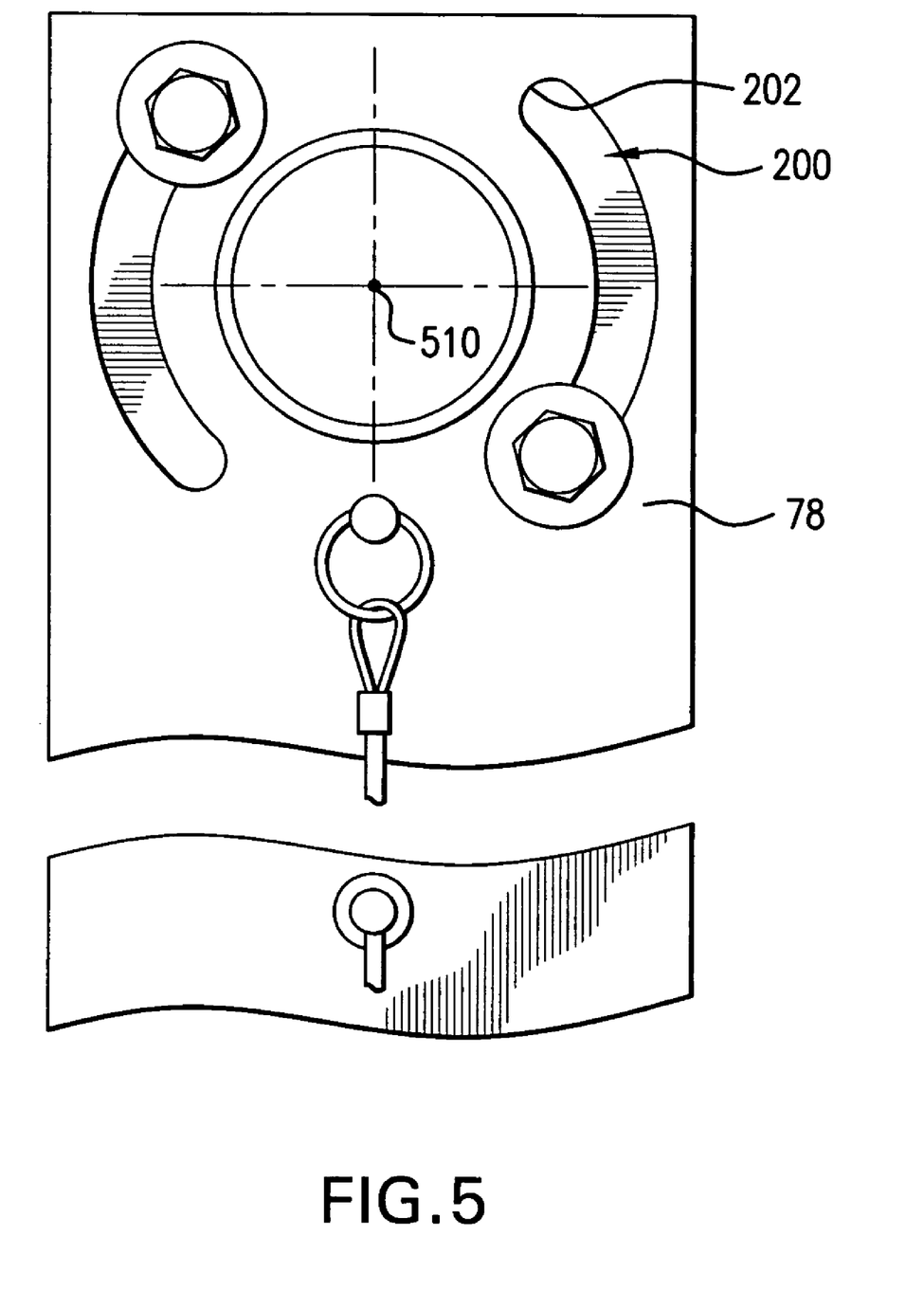
FIG. 5 is a back view of an upper portion of a back upright of the fixture of FIG. 2.

The exemplary locking members 182 are cap screws (e.g., hex-head). In the exemplary fixture 26, the shafts of these cap screws pass through slots 200 (FIG. 5) in the upright 78. The exemplary slots 200 are formed essentially as annular segments of slightly more than 90 degree extent about the axis 510. Each of the slots 200 has a pair of circumferential ends 202 which determine ends of a rotational range of motion with the screws 182 installed in a given set of corresponding holes in the block 120. FIG. 4 shows four such corresponding holes 210, 212, 214, and 216 evenly spaced about the axis 510 exactly out of phase with the holes 188, 192, and 194. In the exemplary fixture, these holes 210, 212, 214, and 216 are threaded to receive the shafts of the screws 182. Accordingly, when these screws 182 are tightened, the block 120 is firmly secured to the upright 78. By changing the particular pair of these holes engaged by the screws 182, a full range of rotation about the axis 510 may be obtained subject to the lockouts provided by the pin 180.

Figure 6:
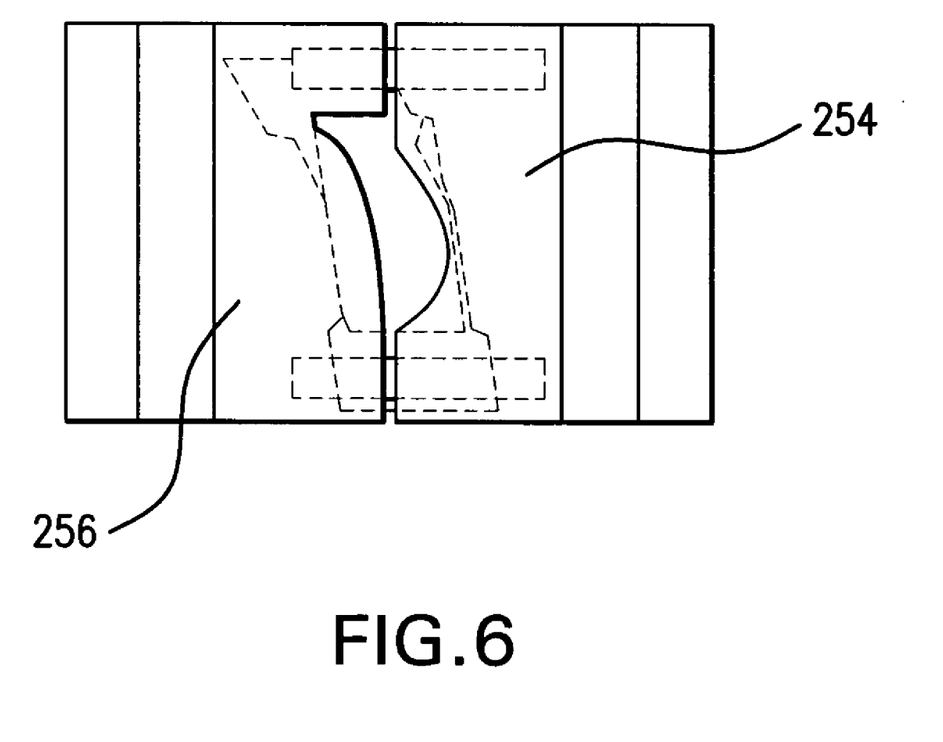
FIG. 6 is a isolated bottom view of a mated jaw pair of the fixture of FIG. 2.

The exemplary jaws 50 and 52 of FIG. 4 are each assemblies of a metallic structural member 250 and 252 with a polymeric blade-engaging member 254 and 256. The exemplary structural members 250 and 252 are identical to each other. The blade-engaging members have internal surfaces 258 and 260 for engaging the blade. These surfaces 258 and 260 include respective convex and concave portions generally complementary to the pressure and suction sides 270 and 272 of the airfoil. The exemplary polymeric members 254 and 256 are heat bonded to their associated metallic members 250 and 252. FIGS. 2 and 6 further show a pair of pins 280 press fit in bores 282 in the polymeric member 256 and slidingly extending into bores 284 in the mating polymeric member 254. The pins 280 serve an alignment function. As the jaw 52 is driven in the direction 512, there is a degree of float in the mounting of the block 102 to the screw 94. Engagement of the pins 280 with the bores 284 provides proper alignment of the two jaws 50 and 52 as the jaws are closed around the blade. The exemplary polymeric members 254 and 256 are heat bonded to their associated metallic members 250 and 252. FIGS. 2 and 6 further show a pair of pins 280 press fit in bores 282 in the polymeric member 256 and slidingly extending into bores 284 in the mating polymeric member 254. The pins 280 serve an alignment function. As the jaw 52 is driven in the direction 512, there is a degree of float in the mounting of the block 102 to the screw 94. Engagement of the pins 280 with the bores 284 provides proper alignment of the two jaws 50 and 52 as the jaws are closed around the blade.

In operation, the fixture is installed to the base and remains fixed. To mark a blade, the operator installs the jaws for that blade if they are not already installed. The operator then inserts the blade and clamps the jaws. The operator then orients the desired marking site in the marking orientation. The operator then manually or semi-manually brings the head to the correct height (e.g., so that the tip is at the appropriate height). In this height the tip may be slightly above the marking site, height but has a reciprocal range of motion effective to provide the indentation. Then, under automatic control, the marker provides the desired marking. This may involve motors in the head moving the tip to a given location along the site, indenting to provide a first indentation or pixel, moving the tip transversely to the location of the next pixel and so on.

The use of an articulating fixture may have several advantages. First, for processing any given part configuration (e.g., a given blade) only a single pair of jaws are required. For example, FIG. 1 shows a second pair of jaws 50' and 52' and a third pair of jaws 50" and 52" interchangeable with the installed jaws 50 and 52 and having engagement surfaces complementary with the airfoil of different blade configurations (different in form). This may be distinguished from several fixtures for each part configuration. This reduction saves cost and changeover time. Furthermore, large scale processing may be facilitated. The parts may be installed to the associated jaw pairs without reference to which site on the part will ultimately be marked. Then the fixture may be articulated to bring the desired unmarked marking site into the proper position and orientation. The need to change fixtures for different parts is also reduced or eliminated.

One or more embodiments of the present invention have been described. Nevertheless, it will be understood that various modifications may be made without departing from the spirit and scope of the invention. For example, details of the particular parts and the particular marking apparatus used may influence details of any particular implementation. Accordingly, other embodiments are within the scope of the following claims.

What is claimed is:

1. An apparatus comprising:
  a fixture having:
    a base;
    means for receiving a pair of jaws in an installed condition; and
    means for articulating the installed jaws relative to the base with at least first and second rotational degrees of freedom, the first rotational degree of freedom about a first axis extending through the first and second jaws and the second rotational degree of freedom about a second axis above the first axis; and
  at least a first pair of said jaws comprising:
    a first jaw having a surface portion generally concave and complementary to a suction side portion of an airfoil of a first turbine engine element; and
    a second jaw having a surface portion generally convex and complementary to a pressure side portion of an airfoil of said first turbine engine element.

2. The apparatus of claim 1 further comprising:
  a dot peen marker positioned to mark the first turbine element.

3. The apparatus of claim 1 further comprising:
  at least one additional pair of jaws interchangeable with the pair of jaws and having:
    a first jaw having a surface portion generally concave and complementary to a suction side portion of an airfoil of another turbine engine element, different in form from the first turbine engine element;
    a second jaw having a surface portion generally convex and complementary to a pressure side portion of an airfoil of said another turbine engine element.

4. The apparatus of claim 1 further comprising:
  a plurality of additional pairs of jaws interchangeable with the pair of jaws and each having:
    a first jaw having a surface portion generally concave and complementary to a suction side portion of an airfoil of an associated turbine engine element, different in form from the other turbine engine elements; and
    a second jaw having a surface portion generally convex and complementary to a pressure side portion of an airfoil of said associated turbine engine element.

5. The apparatus of claim 1 wherein:
  the means for articulating includes means for locking the first and second rotational degrees of freedom.

6. The apparatus of claim 1 wherein:
  the means for articulating provides no additional rotational degree of freedom.

7. The apparatus of claim 1 wherein:
  the second axis is beyond the first and second jaws and orthogonal to the first axis.

8. The apparatus of claim 1 wherein:
  the means for receiving comprise:
    a first mounting block for receiving the first jaw and directly lockably held for lockable rotation about a first axis; and
    a second mounting block for receiving the second jaw and directly lockably held for lockable rotation about said first axis; and
  the apparatus further comprises means for translating the second block along the first axis toward the first block.

9. The apparatus of claim 8 wherein:
  the first rotational degree of freedom consists essentially of rotation about the first axis.

10. A method for using the apparatus of claim 1 comprising:
  receiving said first turbine engine element;
  installing the first pair of jaws to the fixture;
  installing said first turbine engine element to the first pair of jaws;
  selecting a first marking site on the first turbine engine element;

articulating the fixture to bring the first marking site to a first spatial relationship with a marking device; and marking the first marking site using the marking device.

11. The method of claim 10 wherein the selecting is from a predetermined group of marking sites and includes excluding at least one already-marked site from said group.

12. The method of claim 10 wherein the first marking site is on a root portion of the first turbine engine element.

13. The method of claim 10 wherein the marking comprises dot peen marking.

14. The method of claim 10 wherein:
the first turbine engine element is a blade and the first marking site is on an attachment root of the blade.

15. The method of claim 10 further comprising
receiving second turbine engine element different in form from the first turbine engine element;
installing a second pair of jaws, different in form from the first pair of jaws, to the fixture;
installing said second turbine engine element to the second pair of jaws;
selecting a first marking site on the second turbine engine element, optionally similar to the first marking site on the first turbine engine element;
articulating the fixture to bring the first marking site on the second turbine engine element to said first spatial relationship with a marking device; and
marking the first marking site on the second turbine engine element using the marking device.

16. An apparatus for marking a turbine element comprising:
a marker; and
a fixture having:
a fixture base;
a first jaw having a surface portion engaging a first portion of the turbine engine element in an engaged condition;
a second jaw having a surface portion engaging a second portion of the turbine engine element in the engaged condition;
at least one aligment pin carried by one of the first and second jaws for engaging a hole in the other of said first and second jaws; and
a fixture body carrying the first and second jaws rotatably about a first axis and carried by the fixture base rotatably about a second axis.

17. The apparatus of claim 16 wherein:
the marker is a dot peen marker.

18. The apparatus of claim 16 wherein:
the fixture base has an upwardly concave surface with the second axis as an axis of curvature; and
the fixture body has a downwardly convex surface with the second axis as an axis of curvature.

19. The apparatus of claim 16 wherein:
the fixture body carries the second jaw by a jack screw rotatable in a first direction about the first axis to drive the second jaw toward the first jaw.

20. The apparatus of claim 16 wherein:
said at least one alignment pin comprises first and second pins carried by the same one of the first and second jaws.

21. A method performed with a marking device and a fixture, the fixture having
a base;
means for receiving a pair of jaws in an installed condition; and means for articulating the installed jaws relative to the base with at least first and second rotational degrees of freedom; and
at least a first pair of said jaws comprising:
a first jaw having a surface portion generally concave and complementary to a suction side portion of an airfoil of a first turbine engine element; and
a second jaw having a surface portion generally convex and complementary to a pressure side portion of an airfoil of said first turbine engine element,
the method comprising:
receiving said first turbine engine element;
installing the first pair of jaws to the fixture;
installing said first turbine engine element to the first pair of jaws;
selecting a first marking site on the first turbine engine element;
articulating the fixture to bring the first marking site to a first spatial relationship with the marking device;
marking the first marking site using the marking device;
receiving a second turbine engine element different in form from the first turbine engine element;
installing a second pair of jaws, different in form from the first pair of jaws, to the fixture;
installing said second turbine engine element to the second pair of jaws;
selecting a first marking site on the second turbine engine element, optionally similar to the first marking site on the first turbine engine element;
articulating the fixture to bring the first marking site on the second turbine engine element to said first spatial relationship with a marking device; and
marking the first marking site on the second turbine engine element using the marking device.

22. An apparatus comprising:
a fixture having:
a base;
means for receiving a pair of jaws in an installed condition; and
means for articulating the installed jaws relative to the base with at least first and second rotational degrees of freedom; and
a first pair of said jaws comprising:
a first jaw having a surface portion generally concave and complementary to a suction side portion of an airfoil of a first turbine engine element; and
a second jaw having a surface portion generally convex and complementary to a pressure side portion of an airfoil of said first turbine engine element;
at least one additional pair of said jaws interchangeable with the first pair of jaws and having:
a first jaw having a surface portion generally concave and complementary to a suction side portion of an airfoil of another turbine engine element, different in form from the first turbine engine element; and
a second jaw having a surface portion generally convex and complementary to a pressure side portion of an airfoil of said another turbine engine element.

23. The apparatus of claim 22 further comprising:
a dot peen marker positioned to mark the turbine engine element.

* * * * *